United States Patent [19]
Tsang et al.

[11] Patent Number: 6,110,236
[45] Date of Patent: Aug. 29, 2000

[54] METHOD OF PREPARING ELECTRODES HAVING EVENLY DISTRIBUTED COMPONENT MIXTURES

[75] Inventors: Floris Y. Tsang, Walnut Creek; Steven J. Visco, Berkeley; May-Ying Chu, Oakland, all of Calif.

[73] Assignee: PolyPlus Battery Company, Inc., Berkeley, Calif.

[21] Appl. No.: 09/151,485

[22] Filed: Sep. 11, 1998

[51] Int. Cl.$^7$ ...................................................... H04M 6/00
[52] U.S. Cl. ........................ 29/623.5; 429/213; 429/218.1
[58] Field of Search ............................... 29/623.1, 623.5; 429/218.1, 218.95, 213

[56] References Cited

U.S. PATENT DOCUMENTS

| | | | |
|---|---|---|---|
| 3,859,139 | 1/1975 | Dews et al. ........................ | 136/120 FC |
| 5,358,802 | 10/1994 | Mayer et al. ............................ | 429/218 |
| 5,532,077 | 7/1996 | Chu ........................................ | 429/102 |
| 5,558,954 | 9/1996 | Morrison ................................. | 429/218 |
| 5,616,309 | 4/1997 | Zachau-Christiansen et al. ..... | 423/592 |

*Primary Examiner*—Carol Chaney
*Attorney, Agent, or Firm*—Beyer Weaver & Thomas, LLP

[57] ABSTRACT

A process for forming an electrode involves mixing or homogenizing one or more electrode components in a "fugitive carrier". This mixture is then frozen by dropping the temperature to a level below which the fugitive carrier freezes. This locks the well-mixed electrode components in place in a solid matrix to form an electrode precursor. Thereafter, the fugitive carrier is sublimated from the electrode precursor to form an electrode in which the components are substantially unsegregated.

20 Claims, 2 Drawing Sheets

METHOD OF PREPARING ELECTRODES HAVING EVENLY DISTRIBUTED COMPONENT MIXTURES

BACKGROUND OF THE INVENTION

The present invention relates to methods of preparing electrodes for batteries and other electrochemical devices. More specifically, the invention relates to a freeze-drying technique to minimize redistribution of electrode components during solvent removal.

Electrodes are critical components of batteries, fuel cells, supercapacitors, and other electrochemical devices. Typically they are prepared by mixing various components necessary for proper operation of the electrode in a liquid carrier such as a solvent. The components are well mixed with one another in the carrier to form a slurry. The slurry is then coated onto a current collector or other support and allowed to dry.

During the drying process, the liquid carrier is driven off by evaporation. This typically precipitates dissolved species and redistributes both soluble and insoluble electrode components so that some segregation occurs. Thus, while the components may have been initially well mixed in the slurry, they segregate and agglomerate to some extent during evaporation. This segregation may be due to capillary forces, natural affinities of the materials, variations in solubility, different settling rates of the components, and other physical and chemical factors.

Generally, the electrode components should be very well mixed to achieve high utilization. In a battery electrode, for example, an electroactive material must be immediately accessible to both electrons and ions in order to provide electrochemical energy. In many cases, the electrochemically active material does not conduct ions or electrons or both. In such cases, the electrode must include an ionic conductor and an electronic conductor in addition to the electroactive material. To obtain electrochemical energy from a given molecule of the electroactive species, it must be intimately contacted by both the ionic conductor and the electronic conductor. Obviously, the segregation of these components during the drying step of a conventional electrode fabrication process reduces the available capacity of the electroactive species.

A related problem occurs when an electronic or ionic conductor species becomes segregated to the point where they fail to form an interconnected matrix allowing a continuous path from an ion or electron source to the electrode interior. The electron source is usually a current collector which may be a metal plate mounted on the back of the electrode. The ion source is usually the electrolyte which contacts the opposite side of the electrode. If the electrolyte is a liquid, it may permeate through a porous electrode and itself serve as the ionic conductor. When an electronic conductor or an ionic conductor, if needed, forms disconnected islands which do not have a clear path back to the source of electrons or ions, the electroactive material contacting such islands may not be available to generate electrochemical energy.

It is also very difficult to produce relatively thick electrodes (e.g., of thickness greater than about 300 micrometers) from liquid carrier processes. This is because a "skin" will form on the electrode surface during the evaporation. This skin reduces the rate at which evaporation can take place. In essence, the skin forms a barrier to the transport of vaporized carrier out of the electrode. This may greatly increase the length of time required to evaporate the carrier and thereby form the electrode.

What is needed, therefore, is an improved process for preparing multi-component electrodes.

SUMMARY OF THE INVENTION

The present invention fills this need by providing a process in which well-mixed electrode components are frozen in place in a solid "fugitive carrier." Thereafter, the fugitive carrier is sublimated from the electrode precursor to form an electrode in which the components are substantially unsegregated. In short, the invention provides a method for forming an electrode by freeze drying.

In one aspect, the present invention provides a method of producing an electrode, which method may be characterized by the following sequence: (1) forming a mixture of two or more electrode components in a liquid phase fugitive carrier; (2) freezing the mixture to form an electrode precursor; and (3) sublimating the fugitive carrier from the electrode precursor. The electrode components may include any one or more of the following: an electroactive material, an electronic conductor, an electrode binder, an ionic conductor, etc. The fugitive carrier should have a relatively high melting point and a high vapor pressure at a reasonable processing temperature. Examples include camphene, p-chloropyridine, biphenyl, p-bromobenzonitrile, p-chlorobenzonitrile, 2-nitromesitylene, durene, nitrosobenzene, triethyl phosphine oxide, p-dichlorobenzene, benzene, and naphthalene.

Another aspect of the invention provides a method of producing a sulfur electrode. The method may be characterized by the following sequence: (1) combining sulfur (e.g., elemental sulfur) and a fugitive carrier to form a solution; (2) freezing the solution to form a sulfur electrode precursor; and (3) sublimating the fugitive carrier from the sulfur electrode. Sulfur electrodes formed in this manner may be used to produce metal-sulfur batteries, for example.

These and other features and advantages of the present invention will be described in more detail below with reference to the associated drawings.

DETAILED DESCRIPTION OF THE PREFERRED EMBODIMENTS

Figure 1:
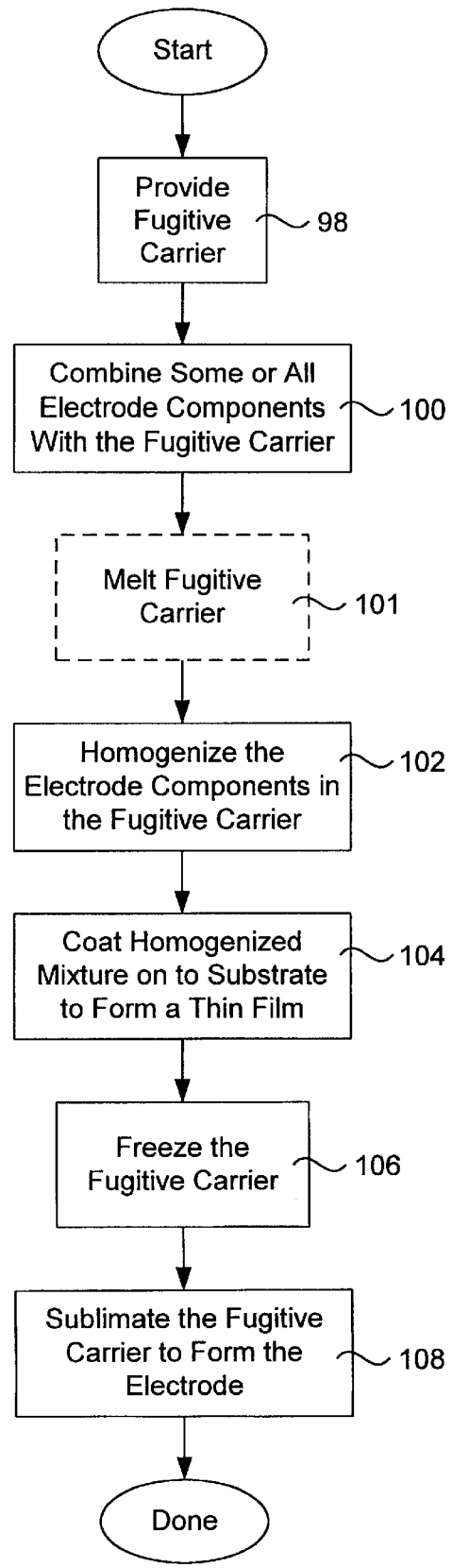
FIG. 1 is a flow chart depicting the steps employed in one embodiment of the present invention.

In the following description, the invention is presented in terms of certain specific compositions, configurations, and processes to help explain how it may be practiced. The invention is not limited to these specific embodiments. For example, while much of the following discussion focuses on methods of producing sulfur electrodes, the invention pertains more broadly to methods of producing other electrodes as well. The electrodes may be used for primary batteries, secondary batteries, fuel cells, etc. The invention also pertains to methods of forming electrolyte separators.

The electrochemical process in an electrode takes place where all three of the following are present at a surface which supports charge transfer: (1) current passage to the current collector, (2) ionic passage to the counter electrode, and (3) an electroactive species. A desirable electrode should possess an abundance of such sites, as well as possessing sufficient physical integrity. Another important factor would be the morphology of the superstructure. While most liquid phase cathode active species can easily migrate, any solid phase would have to be physically transported to such active sites, either via dissolution, or by chemical reactions to form a liquid-phase species. If the solubility is limited and/or migration rate is slow, then "dead volume" will result from excessively large "pockets". In general, it would be beneficial to have sufficiently even distribution so that all active materials could reach an active site easily. As indicated above, a commonly used method of preparing an electrode involves preparing a precursor "paste", containing a carbon black for conduction and a binder for integrity, with or without (in which case the active material will be post introduced) an active material, to be applied and dried. The problem occurs during the drying stage, when surface forces can redistribute the residue to yield undesirable morphologies.

The present method involves a modified "freeze-drying" technique. More specifically, it makes use of a fugitive carrier that preferably has the following properties: (1) a melting point above a chosen processing temperature, (2) a sufficiently high vapor pressure at the chosen processing temperature, (3) a strong but inert solvent for the binder and some or all of the electroactive materials, and (4) compatibility with some form of carbon (or other electronic conductor) that will give the final product acceptable conductance. In an exemplary process, the carrier is warmed up to some suitable temperature, the electroactive material and binder are dissolved into it, the electronic conductor is added, and the resulting "paste" is cast into the desired shape and cooled to solidify the carrier. This frozen article now contains the carrier as well as any solids that has separated out of solution during the cool-down. The cooling rate can be controlled to change the size of the precipitate. The undissolved particles (e.g., carbon electronically conductive material) could be chosen to facilitate the seeding. As a result, the electrode components are no longer subjected to gross rearrangement upon removal of the carrier. A desirable superstructure of this product would contain enough binder (not necessarily continuous but preferably has sufficient connectivity) to give integrity, enough carbon to have both "thorough percolation" (this term is used here to describe a state where there is not only continuous path from one surface to another, but is also essentially void of any insulated clusters) and extremely high electroactive surface area, evenly distributed cathode active material, and a continuous and evenly distributed carrier phase, so that, after the removal of the carrier, would provide a pore structure to ensure an ionic passage upon addition of an electrolyte solution.

A preferred method of making electrodes in accordance with this invention is illustrated in the flow chart of FIG. 1. The method begins with a step 98 in which a fugitive carrier is provided for use in the process. Depending upon the melting point of the fugitive carrier and the ambient temperature, the fugitive carrier may be melted at this point. Next, a step 100 involves combining some or all of the electrode components (typically including at least an electronic conductor and a binder and sometimes including an electrochemically active material) with the fugitive carrier to form a mixture. The fugitive carrier may be liquid or solid at this point. If the fugitive carrier is solid, the mixture will have to be heated to melt the fugitive carrier (step 101). Obviously, this step will not have to be performed if the carrier exists in a liquid state at this stage of the process. Next, at a step 102, the mixture is homogenized such that the electrode components are well mixed and free of agglomerates.

After the electrode components are homogenized in the fugitive carrier, the resulting mixture is coated on a substrate to form a thin film at a step 104. Best results will generally be obtained if the mixture is homogenized immediately before the film formation at step 104. This ensures that the mixture components have not settled or separated to any significant degree, thus providing a uniform film with the desired ratio of electrode components. Next, at a step 106, the fugitive carrier in the coated film is frozen to form an electrode precursor. This locks the electrode components into place and prevents segregation. Again, the best results will be obtained if the homogenization and coating steps are performed immediately before the freezing step—prior to settling or separation of the electrode components. Finally, at a step 108, the frozen fugitive carrier is removed from the electrode precursor by sublimation. This may involve raising the electrode precursor temperature to a level where its vapor pressure is significant but below its melting point.

The fugitive carrier should sublimate easily; that is, it should have a sufficient vapor pressure at a convenient temperature. In a preferred embodiment, the fugitive carrier has a vapor pressure of between about 0.1 and 10 Torr at a chosen sublimation temperature. In a specific embodiment, the sublimation temperature is between 0 degrees Centigrade and the melting point of the fugitive carrier. The sublimation temperature for the process may be influenced by the electrode components employed. Specifically, the electrode components may undergo detrimental reactions or phase change at higher temperatures. For example, if elemental sulfur is used in the mixture, the sublimation temperature is preferably kept below about 70 degrees Centigrade because sulfur itself sublimes at significant rates at higher temperatures. Further, electrode mixtures that include some polymeric binders should not be heated above about 200 degrees Centigrade, a temperature at which some binders may decompose or react with other electrode components such as sulfur. When in its liquid state, the fugitive carrier may solubilize certain components such as a binder and an electroactive material. Examples of suitable fugitive carriers for many applications include camphene, p-chloropyridine, biphenyl, p-bromobenzonitrile, p-chlorobenzonitrile, 2-nitromesitylene, durene, nitrosobenzene, triethyl phosphine oxide, para-dichlorobenzene, naphthalene, and benzene, for example.

Note that the fugitive carrier may be provided as a liquid or a solid at step 98. If it is a liquid, then the electrode components are added to it and mixed to form a slurry in steps 100 and 102; step 101 need not be performed. On the other hand, if the carrier is initially provided as a solid, then it must be melted at step 101 after it has been combined with the group of electrode materials.

The electrode components combined at step 100 may be all the components that ultimately find their way into the final electrode or they may be only a fraction of the components. Components typically found in the electrode (and combined at step 100) include an electronic conductor (e.g., carbon), a binder, an ionic conductor (in solid or gel format batteries), and the electroactive material. If the battery employs a liquid electrolyte, the positive electrode may require only an electronic conductor in addition to the electroactive material. The electrolyte itself permeates the electrode and acts as the ionic conductor. In the case of a liquid electrolyte cell, the battery design may assume two formats: (1) all electroactive material is dissolved in electrolyte solution (one phase positive electrode) and (2) the electroactive material is distributed between a solid phase (sometimes precipitated) and a liquid phase.

In a sulfur electrode for example, the mixture may include all components but the electroactive material (sulfur). The sulfur would be added after the process is completed, in the form of a catholyte containing dissolved sulfur which may precipitate on the electronic conductor during charging. Alternatively, the sulfur be added to the mixture during electrode fabrication in accordance with this invention. In another embodiment, an electrode fabricated with sulfur loading in accordance with this invention could be further loaded with polysulfides by introduction of catholyte into the pore structure. Sulfur positive electrodes and metal-sulfur batteries are described in U.S. Pat. No. 5,686,201 issued to Chu on Nov. 11, 1997 and U.S. patent application Ser. No. 08/948,969 naming Chu et al. as inventors, filed on Oct. 10, 1997. Both of these documents are incorporated by reference for all purposes.

In an alternative embodiment, the electrode precursor contains only sulfur as an electrode component. In this case, the sulfur electroactive material and the fugitive carrier are combined to form a solution in which some or all of the sulfur dissolves in the liquid phase fugitive carrier. The fugitive carrier is then sublimated and the remaining matrix has very high loading of electroactive sulfur. Electronically conductive material can be added subsequently to form an interconnected network of conductive pathways. Note that an electronic conductor requires as little volume as about 16 percent to form a fully interconnected network.

Examples of electronic conductors that may be used with this method include carbon black, electronically conductive compounds with conjugated carbon-carbon and/or carbon-nitrogen double bonds, for example but not limited to, electronically conductive polymers, such as, polyaniline, polythiophene, polyacetylene, polypyrrole, and combinations of such electronically conductive materials. The electronically conductive materials of the electrode may also have electrocatalytic activity. Other examples of electronically conductive materials include metal fibers such as high aspect ratio stainless steel fibers. Such fibers are now available and may be on the order of 2 micrometers in diameter and 1 millimeter in length.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. One advantage of the present invention is that it allows generation of such interconnected matrixes. However, in one embodiment, the electronic conductor is provided as an interconnected matrix at the beginning of the process. Such electronic conductors may be fibrous materials such as a felt or paper. Examples of suitable materials include a carbon paper from Lydall Technical Papers Corporation of Rochester, N.H. and a graphite felt available from Electrosynthesis Company of Lancaster, N.Y. When such materials are used with this invention, they are soaked with the liquid state mixture of the other electrode components and the fugitive carrier.

Preferred binders (1) do not swell in a liquid electrolyte and (2) allow partial but not complete wetting of the electroactive material by the liquid electrolyte. Examples of suitable binders include Kynar available from Elf Atochem of Philadelphia, Pa., polytetrafluoroethylene dispersions, polyethylene oxide (of about 900 k molecular weight for example), polyvinyl chloride, polyvinylidenedifluoride, and polyethylene. Obviously, the choice of binder will depend upon which electrochemical system is employed.

The ionically conductive material employed in the composite electrode may be a polymeric electrolyte such as a polyether (e.g., a polyalkylene oxide), a polyimine, a polythioether, a polyphosphazene, polymer blends of these, and the like. The polymeric ionic conductor preferably includes an appropriate salt. The ionically conductive material may also be a glass and/or ceramic material of the type sometimes used as electrolyte separators. Examples include beta alumina-type materials, Nasicon or Lisicon glass or ceramic.

The electroactive material may be any material that can react to produce electrochemical energy. Usually, the material will be used in porous electrodes. Examples include sulfur (including polysulfides and sulfides), electroactive polymers (including those whose chains break and reform during cycling), titanium sulfide, iron sulfide, intercalation compounds (including transition metal oxides and carbon), etc. The electroactive material may also be combinations of these materials such as a combination of sulfur and iron sulfide or sulfur and titanium sulfide. Further details of such mixed electrodes are described in U.S. patent application Ser. No. 09/148,484 (attorney docket no. PLUSP018) filed on Sept. 1, 1998, naming B. Katz et al. as inventors and entitled "HIGH CAPACITY/HIGH DISCHARGE RATE RECHARGEABLE POSITIVE ELECTRODE." That application is incorporated herein by reference for all purposes.

Other components may also be added to the electrode according to the needs of the particular battery system in which the electrode is to be used. In the case of a sulfur electrode for a metal-sulfur battery, for example, the electrode may further optionally include performance enhancing additives such as electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and protective layer forming additives to protect a lithium negative electrode (e.g., organosulfur compounds, phosphates, iodides, iodine, metal sulfides, nitrides, and fluorides). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

The process of homogenizing the electrode components (step 102 of FIG. 1) may take a variety of forms in accordance with the present invention. The process may vary depending upon whether electrode fabrication is performed batchwise or continuous. For small-scale batch operations, suitable slurry homogenization apparatus includes stir bars (preferably cross-type stir bars), paint mixers such as rotary blade mixers, paint shakers, and shear mixers. Further, any mixing apparatus conventionally used to make "slips" in the ceramic processing arts will be sufficient for use with this invention. By way of example, some other batch mixing systems employ ball milling, tumble mixing, shear mixing, etc. The amount of time required to obtain a suitably homogenous mixture can be determined by routine experimentation with each of these pieces of mixing equipment.

In large-scale and/or continuous electrode fabrication systems, an industrial agitator will generally be preferable.

Design criteria for such systems are well known in the art and are discussed at, for example, pages 222–264 of McCabe and Smith "Unit Operations of Chemical Engineering" Third Edition, McGraw Hill Book Company, New York (1976), which reference is incorporated by reference herein for all purposes. Suitable systems include turbine agitators and axial-flow or radial-flow impellers in tanks or vessels with rounded bottoms. In general, the vessels should not have sharp corners or regions where fluid currents cannot easily penetrate. Further, the system should be designed to prevent circulatory currents which throw solid particles to the outside of the vessel where they move downward and concentrate. Circulatory currents can be mitigated by employing baffles in the system (e.g., vertical strips perpendicular to the wall of the vessel). Shrouded impellers and diffuser rings can also be used for this purpose.

Very soon after the slurry is homogenized, it is deposited as a film on a substrate (step 104 of FIG. 1). The exact amount of time between homogenization and deposition will depend upon the physical character of the slurry (viscosity, solids concentration, solids particle sizes, etc.). Significant settling and separation of the solids in the slurry is to be avoided. Settling can be slowed by employing (a) small particles of low density solids, (b) high concentrations of the solids, and/or (c) highly viscous fugitive carriers (in the liquid state). Further the particles of the various solids components of the slurry can be chosen so that they all settle at about the same rate, thereby avoiding the problem of segregation. To the extent possible, the slurry should be delivered to a substrate immediately after homogenization. For example, slip conditioning and supply systems such as these provided by EPH Associates, Inc. of Orem, Utah may be used to deliver slurry from a homogenizer directly to a substrate.

The slurry film also may be applied by spreading. In batch processes, a Mayer rod—which is rod of about ½ to 1 inch in diameter wound with thin wires—may profitably be used to roll out a thin layer of slurry film on the substrate. In continuous or batch processes, a doctor blade may be employed to deliver a thin layer of slurry to a moving sheet of substrate.

Preferably the substrate on which the slurry is applied is a current collector such as a sheet of stainless steel, aluminum, copper, titanium, metallized PET, or other conductive material which will not react at operating cell conditions. Suitable current collectors may also take the form of expanded metals, screens, meshes, foams, etc. as is known in the art. In alternative embodiments, the substrate may be a sheet of inert material that does not adhere to freeze dried electrode material. One such suitable substrate material is Teflon®. After the electrode film is dried, it is peeled away from such substrate and later contacted to a current collector such as one of the abovementioned materials. Contacting to the current collector may be accomplished by hot pressing, crimping, etc. Alternatively, the current collector can be formed directly on the electrode material by a technique such as metal spraying, sputtering, or other technique known to those of skill in the art.

At step 106, the fugitive carrier is frozen. This serves two purposes. First, it precipitates any components that may be dissolved in the liquid phase carrier. Note that some small quantities of soluble electrode components may remain dissolved in the solid state carrier after freezing. Second, and most importantly, freezing locks the components in place after homogenization. During subsequent solvent removal (sublimation step 108), the electrode components are not free to redistribute or segregate in a fluid medium (as they would be in a conventional slurry casting/evaporation process). Note in particular that dissolved components are precipitated by freezing rather than evaporation in this process. By controlling the precipitation during freezing and the rate of sublimation, the process allows for controlling the pore morphology.

In a preferred embodiment, both steps 104 and 106 may be performed by passing the homogenized mixture produced at step 102 through rollers cooled to a temperature that freezes the fugitive carrier. This will produce a free standing film.

Generally, the freezing step is performed relatively rapidly to prevent possible redistribution during solidification. One way to accomplish this is to expose the mixture to an environment having a temperature significantly below the melting point of the fugitive carrier. During the subsequent sublimation step, the frozen mixture is exposed to a temperature (or range of temperatures) at which sublimation occurs rapidly. The temperature preferably remains below the melting point of the fugitive carrier to prevent melting and potential segregation of the components.

The resulting electrode is preferably a porous, conductive structure with evenly distributed micropores. This structure has integrity and can be evenly prefilled with a variety of fillers. The examples presented below show that the process can produce a strong, conductive, contiguously microporous (50–60% void) positive electrode containing some 0.7 gm/ml of evenly dispersed sulfur.

Further, the electrodes of this invention are fabricated such that they permit electrons to easily move between the electroactive material and the electronically conductive material, and permits ions to move between the electrolyte and the electroactive material. To this end, the electronic conductor in the electrode preferably forms an interconnected matrix so that there is always a clear current path from the current collector to any position in the electronic conductor. This provides high availability of electroactive sites and maintained accessibility to charge carriers over repeated cycling. Thus, high utilization is realized, even after many cycles.

Viewed another way, the method of this invention preferably produces a triply continuous solid after the freezing step (or two continuous phases plus a third substantially continues phase), where one of the continuous phases (e.g., the major phase) is fugitive and can be removed without substantially affecting the bulk structure. Optionally one or more additional continuous or discontinuous phases can also be incorporated. The electronic conductor (e.g., acetylene black) is the other continuous phase (as proven by conduction), and the binder phase may be at least substantially continuous (implied by the integrity and flexibility of the residual film upon removal of the first phase). Sulfur or other electroactive material may be present as evenly distributed, discrete particles.

In a specific embodiment, this invention allows formation of laminated structures in which frozen structures are bonded before or during sublimation. After sublimation a laminated "polymer" battery of the general type described in U.S. Pat. Nos. 5,418,091, 5,540,741, and 5,478,668 results. The frozen electrode structures are formed with a fugitive carrier as described above. In a preferred embodiment, the negative electrode includes a carbon intercalation compound for use in a lithium ion battery, for example. The negative electrode also includes a polymeric binder such as polyvinylidene difluoride ("PVDF"). The positive electrode also includes a polymeric binder such as PVDF and a transition metal oxide such as lithium manganese oxide.

In one embodiment, the polymer electrolyte material is dissolved in a mixed solvent—one solvent is liquid at room temperature and the second is a solid which is dissolved in it. An example might be p-chlorobenzonitrile dissolved in tetrahydrofuran. In this way, the polymer (e.g., PVDF) could dissolve in the THF/p-chlorobenzonitrile solution. The resulting solution is cast into a film from which the THF is allowed to evaporate, leaving solid pchlorobenzonitrile entrapped in PVDF to create internal porosity. At this point, the resulting PVDF films can be hot-pressed, etc. and the p-chlorobenzonitrile can be subsequently removed by sublimation.

Figure 2:
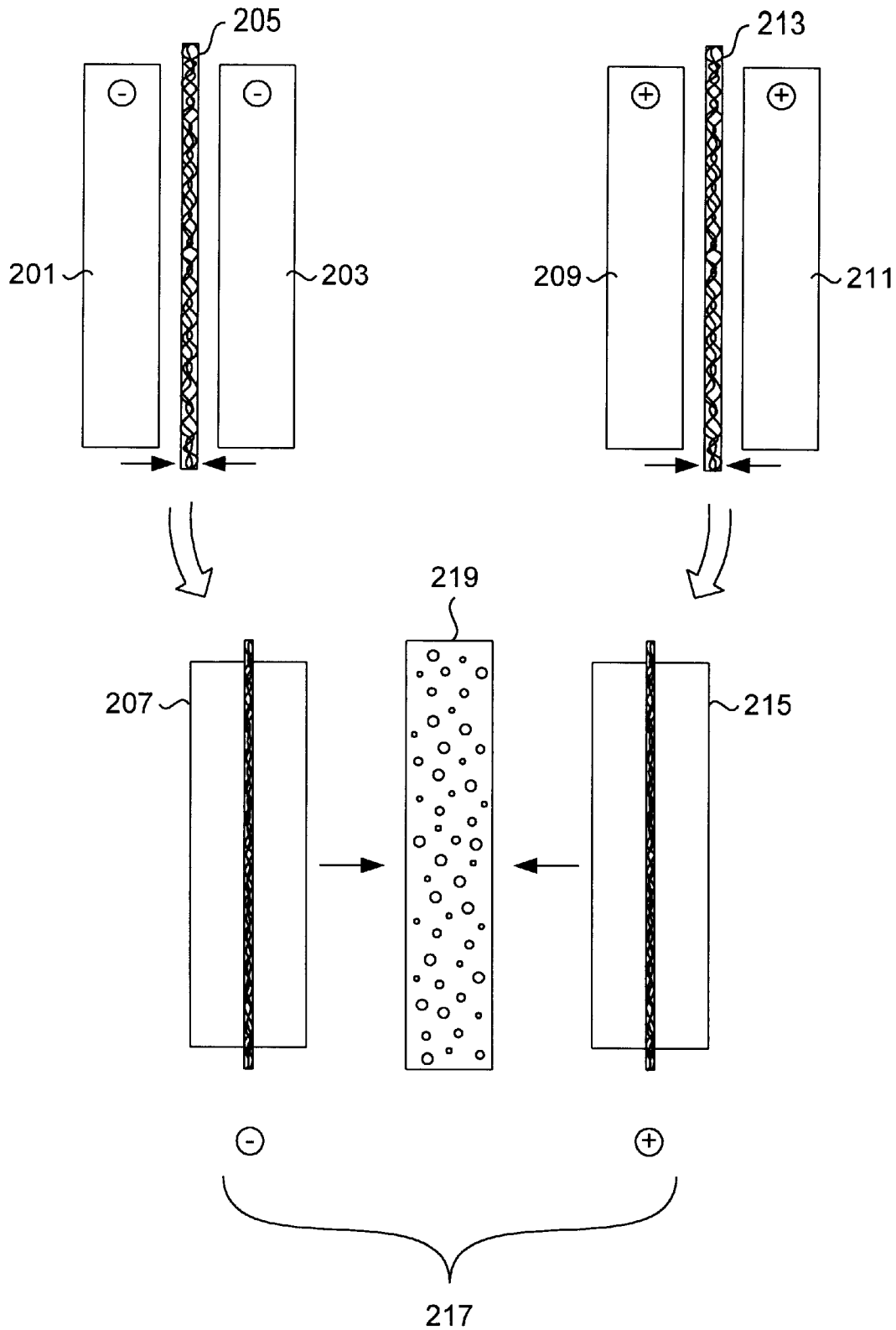
FIG. 2 is a schematic illustration of a process of forming laminated polymer batteries in accordance with one embodiment of this invention.

A preferred process is depicted in FIG. 2 where two frozen negative electrode precursors 201 and 203 are bonded to a negative current collector 205 (e.g., an expanded metal section). A negative electrode laminate 207 results. In addition, two frozen positive electrode precursors 209 and 211 are bonded to a positive current collector 213 to form a positive electrode laminate 215

A portion of a polymer battery laminate 217 is formed by bonding positive electrode laminate 215 to one side of a polymer electrolyte 219 and negative electrode laminate 207 to the other side of polymer electrolyte 219 as illustrated in the lower portion of FIG. 2. Preferably, the polymer electrode is made from a microporous polymer such as PVDF. The microporous morphology may be introduced by extracting plasticizer from the polymer matrix or by freeze drying the polymer with a fugitive carrier. If polymer electrolyte 219 is formed from a frozen precursor, it is preferably bonded to electrode laminates 207 and 215 while each element of the laminate is in the solid state. This should facilitate a strong resilient bond between the individual elements of the laminate.

Preferably the various elements of the laminate are formed by hot pressing (e.g., the elements are pressed between heated plates)As this process may sublimate some of the fugitive carrier from the laiminate layers, the pressing and sublimation steps may be performed concurrently in some embodiments.

In an alternative embodiment, the laminate is formed by first producing layers of paste for each of the electrodes and the electrolyte separator. The paste layers may be produced by extrusion for example and may include a liquid phase fugitive carrier and one or more electrode components. Preferably the paste layers include all electrode components so that no further electrode formation steps are necessary afterward. In this embodiment, the paste layers are contacted with one another so that they can form a laminate precursor. Then the laminate precursor is frozen. The final battery laminate is formed by sublimating the frozen fugitive carrier.

METAL-SULFUR BATTERIES

In a preferred embodiment, the present invention is employed to fabricate sulfur positive electrodes that include, in their theoretically fully charged state, sulfur and an electronically conductive material. At some state of discharge, the positive electrode will include one or more polysulfides and possibly sulfides, which are polysulfides and sulfides of the metal or metals found in the negative electrode. In some embodiments, the fully charged electrode may also include some amount of such sulfides and/or polysulfides.

If the metal-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode may require only an electronic conductor in addition to the sulfur electroactive material. The electrolyte itself permeates the electrode and acts as the ionic conductor. In the case of a liquid electrolyte cell, the battery design may assume two formats: (1) all active sulfur (elemental sulfur, polysulfides and sulfides of the positive electrode) is dissolved in electrolyte solution (one phase positive electrode) and (2) the active sulfur is distributed between a solid phase (sometimes precipitated) and a liquid phase.

When the metal-sulfur battery cells of this invention include a liquid electrolyte, that electrolyte should keep many or all of sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, dimethoxyethane (DME or glyme), hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, and $LiAsF_6$, as well as corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator generally containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator generally contains at least 20% (weight percentage) of an organic liquid (see the above listed liquid electrolytes for examples), with the liquid being immobilized by the inclusion of a gelling agent. Many gelling agents such as polyacrylonitrile, polyvinylidene difluoride (PVDF), or polyethylene oxide (PEO), can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. Each of these patents is incorporated herein by reference for all purposes.

The fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x. Also, while the electrochemically active material includes some substantial fraction of "sulfur," this does not mean that the positive electrode must rely exclusively upon sulfur for its electrochemical energy.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1. The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The battery cells of this invention may be rechargeable "secondary" cells. Unlike primary cells which discharge only once, the secondary cells of this invention cycle between discharge and charge at least two times. Typically, secondary cells of this invention will cycle at least 50 times, with each cycle having a sulfur utilization (measured as a fraction of 1675 mAh/g sulfur output during the discharge phase of the cycle) of at least about 10%. More preferably, at least 50 cycles will have a minimum sulfur utilization of at least about 20% (most preferably at least about 30%). Alternatively, the secondary cells of this invention will cycle at least two times, with each cycle attaining at least 50% utilization of sulfur in the positive electrode.

EXAMPLES

Example 1

A hot plate was heated to a surface temperature of 170 deg. C. Onto it was placed a 50 ml. Pyrex beaker containing 20 gms. of p-dichlorobenzene, which melted after several minutes and reached a temperature of about 100 deg. C. Into it was dissolved 4 gms. of powdered sulfur, followed by 1 gm. of medium molecular weight PVC. After reaffirming that this clear liquid (gently stirred with a small glass rod) was still at about 100 deg.C, a 2 gm. portion of acetylene black was added. This mixture was mixed for several minutes, with the beaker still on the hot plate, to form a thick slurry. This slurry was poured onto an aluminum foil surface, spread out, and let cool rapidly. The resulting "film", approximately 0.5–2 mm thick, was left in a vented hood for four days. The film, now with essentially all of the carrier sublimed (only faint smell remained), was light, flexible and conductive—estimated to be between 0.01 and 0.1 mho/cm.

Another batch was prepared under the same conditions, except that the product was cast into "buttons" of about 1" diameter and 8 mm thickness. Upon cooling, these buttons are very robust—they were sanded flat on both side to yield roughly parallel disks. One of these buttons was left out in the hood, and another was depleted under vacuum. A piece of the 4 mm thick sample, of about 1 cm$^2$ has an resistance of about 12 ohms. This indicates a conductivity of about 3E-2 mho/cm.

Example 2

Another batch of paste was made, similar to that of Example 1, except that only 1.0 gm of acetylene black was used. The resulting product was similar, except with a higher resistance.

Example 3

Another batch of paste was made, similar to Example 1, except that 20 gm. of sulfur was used, and the hot plate temperature was set at 200 deg.C. The temperature of the liquid was not directly measured, but judging from the sulfur melting, it is assume that the processing temperature was in excess of 120 deg.C. The resulting paste was cast onto an aluminum foil surface and cooled rapidly. The cooled thin plate was again sufficient robust so that 2–3 cm piece could be sanded on both surfaces to yield some roughly parallel samples. Again, initial measurements showed good conductance ($2 \times 10^{-3}$ S/cm)

Example 4

Another batch of paste was made similar to Example 1, except no sulfur was added. The resulting film was very light, highly flexible and conductive ($5 \times 10^{-2}$ S/cm)

The foregoing describes the instant invention and its presently preferred embodiments. Numerous modifications and variations in the practice of this invention are expected to occur to those skilled in the art. Such modifications and variations are encompassed within the following claims. All references cited herein are incorporated by reference for all purposes.

What is claimed is:

1. A method of producing an electrode, the method comprising:

forming a mixture of two or more electrode components in a liquid phase fugitive carrier;

coating the mixture on a substrate to form a layer;

freezing the mixture, as coated on the substrate, to form an electrode precursor; and sublimating the frozen fugitive carrier from the electrode precursor to cast the electrode.

2. The method of claim 1, wherein the mixture includes an electronic conductor and an electrode binder.

3. The method of claim 1, wherein the mixture includes an electronic conductor, an electrode binder, and an electroactive material.

4. The method of claim 1, wherein the mixture includes an electronic conductor, wherein the electronic conductor is a carbon material.

5. The method of claim 1, wherein the fugitive carrier has a vapor pressure of between about 0.1 and 10 Torr at a temperature at which it is sublimated from the electrode precursor to form the electrode.

6. The method of claim 1, wherein the fugitive carrier is sublimated from the electrode precursor at a temperature of between about 0 degrees Centigrade and the melting point of the fugitive carrier.

7. The method of claim 1, wherein the fugitive carrier includes at least one of camphene, p-chloropyridine, biphenyl, p-bromobenzonitrile, p-chlorobenzonitrile, 2-nitromesitylene, durene, nitrosobenzene, triethyl phosphine oxide, p-dichlorobenzene, and naphthalene.

8. A method of claim 1, wherein the electrode is a battery electrode.

9. A battery comprising an electrode produced by the method of claim 8.

10. The method of claim 1, wherein the electrode is a fuel cell electrode.

11. A method of producing a sulfur electrode, the method comprising:

combining sulfur and a fugitive carrier to form a solution;

coating the solution on a substrate to form a layer;

freezing the solution, as coated on the substrate, to form a sulfur electrode precursor; and sublimating the frozen fugitive carrier from the electrode precursor to cast the electrode.

12. The method of claim 11, further comprising combining the fugitive carrier or the solution with an electronic conductor and an electrode binder.

13. The method of claim 11, wherein the sulfur includes elemental sulfur.

14. The method of claim 11, further comprising combining the fugitive carrier or the solution with an electronic conductor, wherein the electronic conductor is a carbon material.

15. The method of claim 11, wherein the fugitive carrier has a vapor pressure of between about 0.1 and 10 Torr at a temperature at which it is sublimated from the electrode precursor to form the electrode.

16. The method of claim 11, wherein the fugitive carrier is sublimated from the electrode precursor at a temperature of between about 0 degrees Centigrade and the melting point of the fugitive carrier.

17. The method of claim 11, wherein the fugitive carrier includes at least one of camphene, p-chloropyridine, biphenyl, p-bromobenzonitrile, p-chlorobenzonitrile, 2-nitromesitylene, durene, nitrosobenzene, triethyl phosphine oxide, p-dichlorobenzene, and naphthalene.

18. The method of claim 11, wherein the mixture includes an ionic conductor.

19. A sulfur electrode produced by the method of claim 1.

20. A metal-sulfur battery comprising an electrode as recited in claim 19.

* * * * *